United States Patent
Huang et al.

(10) Patent No.: US 7,637,967 B2
(45) Date of Patent: Dec. 29, 2009

(54) STEPPED GRADIENT FUEL ELECTRODE AND METHOD FOR MAKING THE SAME

(75) Inventors: Keqin Huang, Export, PA (US); Harold D. Harter, Munhall, PA (US); Paul G. Turkal, McMurray, PA (US)

(73) Assignee: Siemens Energy, Inc., Orlando, FL (US)

( * ) Notice: Subject to any disclaimer, the term of this patent is extended or adjusted under 35 U.S.C. 154(b) by 611 days.

(21) Appl. No.: 11/298,321

(22) Filed: Dec. 8, 2005

(65) Prior Publication Data

US 2007/0134543 A1    Jun. 14, 2007

(51) Int. Cl.
*H01M 4/82* (2006.01)
*H01M 4/00* (2006.01)

(52) U.S. Cl. .................... 29/623.1; 429/40

(58) Field of Classification Search ............ None
See application file for complete search history.

(56) References Cited

U.S. PATENT DOCUMENTS

| | | | |
|---|---|---|---|
| 5,712,055 A | 1/1998 | Khandkar | |
| 5,851,689 A | 12/1998 | Chen | |
| 6,103,315 A * | 8/2000 | Gray et al. | 427/454 |
| 6,228,521 B1 | 5/2001 | Kim | |
| 6,656,623 B2 | 12/2003 | Holmes | |
| 6,764,784 B2 | 7/2004 | Gillett | |
| 2003/0224232 A1 | 12/2003 | Browall et al. | |
| 2004/0018409 A1* | 1/2004 | Hui et al. | 429/33 |
| 2004/0197628 A1* | 10/2004 | Yoshikata et al. | 429/30 |
| 2004/0209147 A1 | 10/2004 | Finkenwirth et al. | |
| 2005/0208367 A1 | 9/2005 | Hoefler | |

FOREIGN PATENT DOCUMENTS

| | | |
|---|---|---|
| EP | 1 536 505 A2 | 6/2005 |
| EP | 1536505 A2 * | 6/2005 |
| WO | WO 00/00660 A1 | 1/2000 |

OTHER PUBLICATIONS

Zheng R. et al.: "A study of Ni+8YSZ/8YSZ/La0.6Sr0.4CoO3-delta ITSOFC fabricated by atmospheric plasma spraying" Journal of Power Sources, Elsevier, Amsterdam, NI, vol. 140, No. 2, pp. 217-225.*

R. Zheng, X.M. Zhou, S.R. Wang, T.-L, Wen, C.X. Ding; "A Study of $Ni + 8YSZ/8YSZ/La_{0.6}Sr_{0.4}CoO_{3-\delta}$ ITSOFC fabricated by atmospheric plasma spraying"; Journal of Power Sources, Feb. 2, 2005; pp. 217-225; XP004917729; ISSN: 0378-7753; Elsevier, Amsterdam, NL.

* cited by examiner

*Primary Examiner*—Dah-Wei D Yuan
*Assistant Examiner*—Adam A Arciero

(57) ABSTRACT

The present invention provides for a method of depositing a stepped-gradient fuel electrode onto a fuel cell support 2 and the resulting fuel cell, that comprises placing a solid oxide fuel cell support that has at least an air electrode layer 4 and an electrolyte layer 6 into an atmospheric plasma spraying chamber and measuring spray parameters of an atmospheric plasma spray to obtain reactive oxides, conductive metal and graphite phases. Then spraying the spray parameters onto the solid oxide fuel cell support to produce multiple sub-layers 8 on the solid oxide fuel cell support, and adjusting a hydrogen usage of the atmospheric plasma spray. The adjusting of the hydrogen usage comprises using high hydrogen levels for the initial spraying of the sub-layers producing a first gradient region, and a lower hydrogen level for subsequent spraying of the sub-layers, producing a second gradient region.

11 Claims, 2 Drawing Sheets

US 7,637,967 B2

STEPPED GRADIENT FUEL ELECTRODE AND METHOD FOR MAKING THE SAME

The U.S. Government has a paid-up license in this invention and the right in limited circumstances to require the patent owner to license others on reasonable terms as provided for by the terms of DE-FC26-97FT34139 awarded by DOE.

FIELD OF THE INVENTION

The field of the invention relates to solid oxide fuel cells, and more particularly to the making of the fuel electrodes on the fuel cell.

BACKGROUND

Solid oxide fuel cells (SOFC) offer power generation in designs that produce energy cleanly and efficiently, and as the technology marches towards maturity the wide-spread use of fuel cells becomes closer. Inventions such as the standard package design by Gilleft, U.S. Pat. No. 6,764,784 have help this advancement.

An example of a typical tubular SOFC design is illustrated in cross-section in FIG. 1 with an exaggerated scale. Air flows along the inside of the support tube 2, which has layers on it first a cathode or air electrode substrate 4, then a thin solid electrolyte layer 6, and finally an anode or fuel electrode 8. Finally, there is an interconnection 10 that received electron flow from adjoining fuel cells. Hydrocarbon fuels flowing along the outside of the cell mixes with oxygen delivered by the thin solid electrolyte layer 6 from the air, to form water, carbon dioxide and electrons.

FIG. 2 illustrates a scaled cross-sectional close-up of the anode layers. Oxygen transports through the air electrode substrate 4 and the electrolyte 6 to mix with the hydrocarbon fuels in the fuel electrode 8 to produce water, carbon dioxide and electrons.

The composition of the various anode layers necessarily needs to be different from one another. The electrolyte layer 6 is composed of $Y_2O_3$ or $Sc_2O_3$ doped $ZrO_2$, or Sm-doped $CeO_2$ or an equivalent (collectively referred to herein as YSZ/ScSZ) where Y and Sc are rare earth elements. The air electrode substrate 4, is porous, about 30% porosity, and a homogeneous mix of Ca and Ce doped $LaMnO_3$. The fuel electrode 8 is also porous, about 30% porosity, and is a homogeneous mix of about 25 wt % YSZ/ScSZ and 75 wt % conductive metal.

However, the layers of the fuel electrode perform multiple functions which can be at odds with each other. For example, in the fuel electrode layer, the YSZ/ScSZ content helps the fuel oxidation reaction, but hinders the conduction of the electron flow. Therefore, the prior art has sought to maximize the net benefit of reaction versus conduction in the percentages given above, which, of course involves a compromise on each aspect.

The fuel electrode layers are deposited onto the support tube by slurry-coating techniques such as screen-printing and dip-coating, which give the homogenous layers discussed above.

What is needed is a method and apparatus that will produce fuel cells with layers that have a facile fuel oxidation reaction, as well as a better electronic conduction.

Other difficulties with the prior art also exist, some of which will be apparent upon further reading.

SUMMARY OF THE INVENTION

With the foregoing in mind, methods and apparatuses consistent with the present invention, which inter alia facilitates generation of power from fuel cells by providing stepped gradient electrodes. The fuel electrode of the prior art is a homogenous material, while the present invention provides for a heterogeneous fuel electrode. The fuel electrode comprises two or more distinct regions that vary in base composition and porosity. This allows for greater fuel oxidization and electron flow. Particularly, the regions are made up of one or more sub-layers that have been deposited by APS.

These and other objects, features, and advantages in accordance with the present invention are provided particular embodiments by a method of depositing a stepped-gradient fuel electrode onto a fuel cell support, that comprises placing a solid oxide fuel cell support that has an air electrode layer and an electrolyte layer into a atmospheric plasma spraying chamber and measuring spray parameters of an atmospheric plasma spray to obtain reactive oxides, conductive metal and graphite phases. Then spraying fuel electrode with the spray parameters onto the solid oxide fuel cell support to produce multiple sub-layers on the solid oxide fuel cell support, and adjusting a hydrogen usage of the atmospheric plasma spray. The adjusting of the hydrogen usage comprises using high hydrogen levels for the initial spraying of the sub-layers producing a first gradient region, and a lower hydrogen level for subsequent spraying of the sub-layers, producing a second gradient region. The first gradient region has a reactive oxides content of 25-50% by weight, and the second gradient region has a reactive oxides content of 10-25% by weight.

In other related embodiments the first gradient region comprises 1-4 sub-layers. The first gradient region has a porosity of not greater than 20%, and the second gradient region has a porosity of at least 30%. In some embodiments the fuel electrode comprises more than two gradient regions, and the application is performed by indexing the solid oxide fuel cell support.

In another embodiment the present invention provides for a method for spraying a fuel electrode layer onto a solid oxide fuel cell support, that comprises using an atmospheric plasma sprayer to spay multiple sub-layers onto the fuel cell support, the sub-layers comprise a reactive YSZ/ScSZ phase, a nickel conductive metal and graphite for porosity, and the sub-layers form the fuel electrode layer. Then making multiple adjustments to a hydrogen flow to the plasma sprayer during the spraying of the sub-layers. Each adjustment of the hydrogen flow uses a proportionally greater hydrogen amount than each subsequent adjustment of the hydrogen flow, where sub-layers produced with proportionally greater hydrogen flow have proportionally greater reactive oxides content.

In another embodiment the present invention for a stepped-gradient fuel electrode deposited on a support tube that comprises multiple sub-layers and multiple gradient regions, each of the gradient regions comprises at least one of the sub-layers. Also the sub-layers comprise a homogenous mixture of reactive oxides and conductive metal, and the sub-layers have a porosity. Initial gradient regions comprise greater reactive oxides concentration than succeeding gradient regions.

In related embodiments the initial gradient regions comprise 25-50% by weight reactive oxides. The succeeding gradient regions comprise 10-25% by weight reactive oxides. In some embodiments the reactive oxides are YSZ/ScSZ, and the conductive metal is nickel. Also, the initial gradient regions comprise a lesser porosity than succeeding regions.

Other embodiments of the present invention also exist, which will be apparent upon further reading of the detailed description.

BRIEF DESCRIPTION OF THE FIGURES

The invention is explained in more detail by way of example with reference to the following drawings.

DETAILED DESCRIPTION OF THE INVENTION

Figure 1:
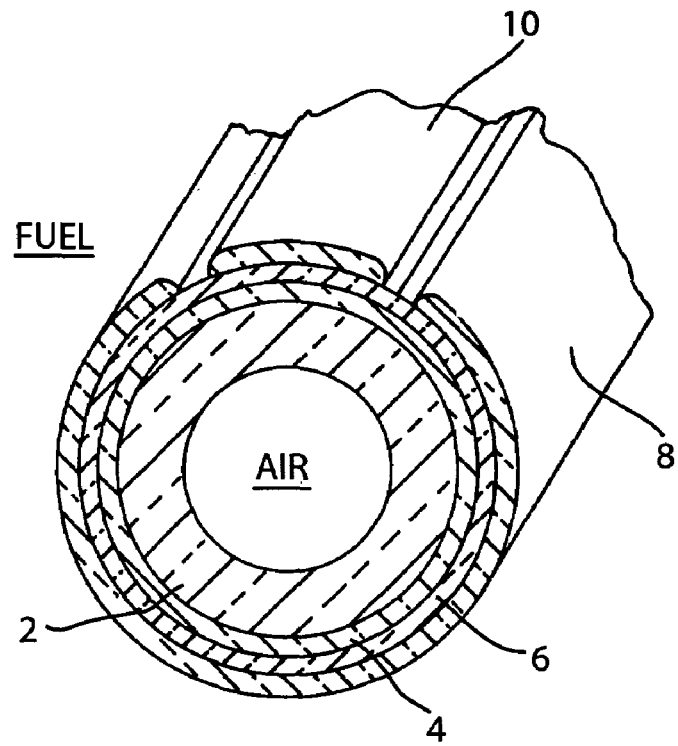
FIG. 1 illustrates a cross-sectional view of a tubular solid oxide fuel cells (SOFC) with an exaggerated scale.
Figure 2:
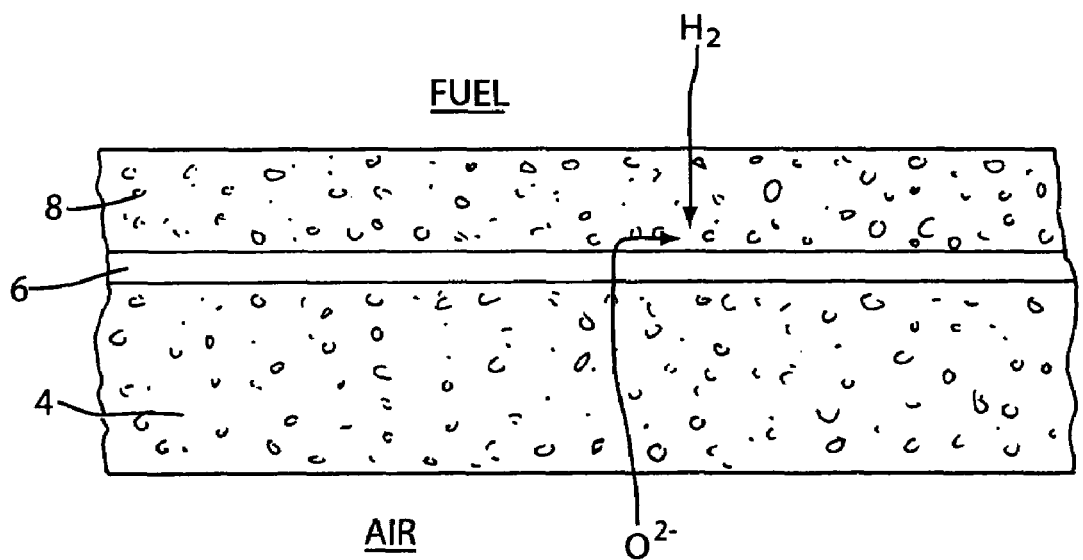
FIG. 2 illustrates a close up view of the fuel electrode layers with an exaggerated scale.

The present invention provides a method and apparatus for depositing a stepped-gradient fuel electrode layer onto a fuel cell support tube. Particularly, the present invention uses atmospheric plasma spraying (APS) to deposit the stepped-gradient fuel electrode layer. In the prior art, fuel electrode layers are formed from homogenous mixtures of a metal phase and an oxide phase, referred to as a cermet. However, the fuel electrode layer can perform multiple functions that require conflicting chemical make-up. For example, the fuel electrode requires a strong YSZ/ScSZ content to aid in the fuel oxidation reaction. However, the greater the YSZ/ScSZ content, the lower the conductive metal content, so the weaker the electron flow. A balance, therefore, between the electrochemical reaction and electronic conduction needed to be reached in the fuel electrode composition.

The present invention deposits the fuel electrode layer onto a support tube in a stepped-gradient manner. The complete layer is approximately 100 μm thick, but comprises many sub-layers. For example, a 100 μm fuel electrodes being layered by an APS will comprise 8-14 sub-layers. The content of the sub-layers can be gradually or quickly varied to produce a heterogeneous complete fuel electrode layer rather than a homogeneous layer of the prior art. The prior taught away from using the APS because of the basic design of fuel cells. For a majority of SOFC developers, fuel-electrode is used as the fuel cell support; it requires certain thickness, typically 0.5 to 1 mm, to provide sufficient mechanical strength. Traditional methods for making this substrate are tape-casting and die-pressing. APS is not suitable for making the substrate.

Each sub-layer itself is homogeneous, and will contain a different pre-determined mixture of reactive components, such as YSZ/ScSZ, conductive metal, such as nickel, and porosity, which is initially a graphite that is later sublimated to create the pores. The sub-layers may be graded in groups, so that the fuel electrode contains at least two different regions, or each of the sub-layers may have their content altered to produce as many different gradients as there are sub-layers. In most embodiments, the number of gradients will be less than the total number of sub-layers, so that at least some sub-layers will be homogenous.

The oxidation reaction of fuel occurs mainly within the region of the fuel electrode that is right next to the electrolyte layers. This region is only about 10-20 μm thick, and the rest of the fuel electrode layer is used for gas diffusion and current conduction. The stepped-gradient of the present invention increases the proportion of oxides in the sub-layers close to the electrolyte side, or bottom, of the fuel electrode, and decreases the proportion of oxides in the sub-layers close to the fuel side, or top, of the fuel electrode. In addition, the porosity, initially controlled by graphite content, can also be decreased on the bottom and increased on the top.

Figure 3:
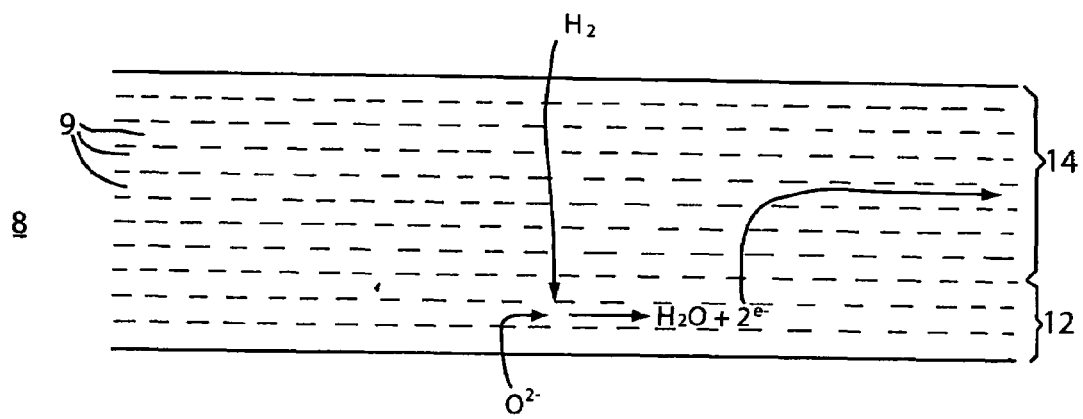
FIG. 3 illustrates the YSZ/ScSZ and graphite contents in plasma sprayed fuel electrode as a function of secondary gas $H_2$ usage.

FIG. 3 illustrates an embodiment of the present invention of a fuel electrode that contains at least two distinct sub-layer regions. The fuel electrode 8 is comprised of multiple sub-layers 9. The bottom layers 12 consisting in this case of approximately 3 sub-layers, will have a high proportion of oxides, for example, 25-50 wt % YSZ/ScSZ, and may even have a porosity of less than 20 vol %. The top layers 14 which comprise the bulk of the fuel electrode, will be higher in conductive metal, for example 75-90 wt % nickel, and may have a porosity of 30 vol % or more.

Therefore, in one embodiment of the present invention, the stepped-gradient comprises at least two distinct sub-layer regions 12, 14, the bottom region being 25-50 wt % of oxides and the top region being 75-90 wt conductive metal. In further embodiments, the bottom region is 20 vol % or less pores, and the top region is 30 vol % or greater pores. In still further embodiments the bottom region comprises 1-4 sub-layers.

If more than two distinct sub-layer regions are used, then the oxide content in the reactive components should be the highest at the bottom and the lowest at the top, with intermediate regions following this trend. If porosity is also altered, then the porosity should increase from bottom to top.

Figure 4:
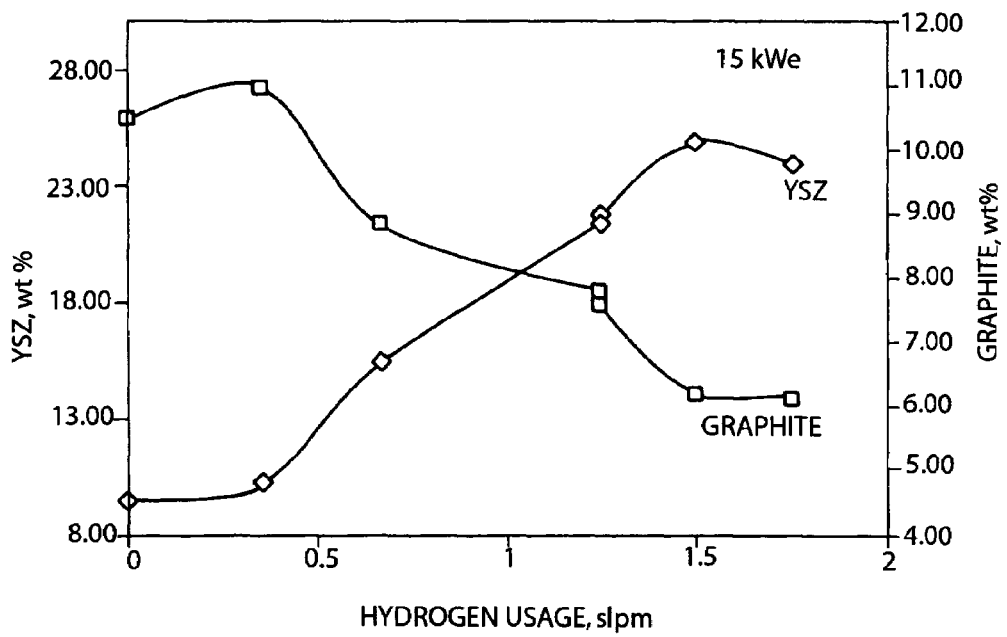
FIG. 4 illustrates the measured YSZ/ScSZ content as a function of flow rate of secondary H2 gas at a fixed 15 kWe gun power level.

A particular embodiment of depositing the stepped-gradient sub-layers is by use of atmospheric plasma spraying (APS). Atmospheric Plasma Spray is the process presently used in the manufacturing of SOFC's. This implies that the atmosphere into which the plasma is discharged, and in which the target (cylindrical, air electrode tube) resides is ambient air. APS is the most used of all of the thermal spray processes as it can develop sufficient energy to melt almost any material. The plasma gun incorporates a cathode (electrode) and an anode (nozzle) separated by a small gap. For APS used in this application, Hydrogen and Argon gases are used. As power is applied to the plasma gun, these gases pass through this small gap. An electrical arc is present and strips the gases of their electrons and a plasma is formed. As the unstable plasma recombines back to the gaseous state, energy is released. By introducing coating material in the form of powder into the gas plume, it is melted and propelled towards the target, after which this powder solidifies on the target surface forming a coating. Since the flow of each of the gases along with power can be accurately controlled, repeatable coating results can be obtained. The advantages of using APS to manufacture various thin layers for SOFCs are best reflected by its capability to achieve a high as-spray density, strong bonding strength and productivity. When using YSZ/ScSZ and Ni, the lower melting point Ni has a higher material utilization than higher melting point YSZ/ScSZ. By altering the plume temperature and particle velocity of the APS, the material utilization and final chemistry of the sub-layers can be adjusted. Referring to FIG. 4, the measured YSZ/ScSZ content as a function of flow rate of secondary $H_2$ gas at a fixed 15 kWe gun power level is illustrated. As shown YSZ/ScSZ content gradually increases with hydrogen below 0.35 slpm and quickly raises to 24 wt % at 1.25 slpm $H_2$, followed by a leveling off at about 1.5 slpm $H_2$. As the plume temperature of the plasma increases with $H_2$ flow, more YSZ/ScSZ melts at higher $H_2$ usage, leading to a higher YSZ/ScSZ content in the deposited sub-layers. The graphite (porosity) content decreases with the usage of hydrogen, since the higher plume temperature helps consume the graphite. Therefore varying the hydrogen flow according to FIG. 4 can produce the sub-layering discussed above.

A particular deposition pattern used by APS known as indexing can be used for particular embodiments. Indexing rotates the cell being sprayed in distinct, 12° turn increments. This can produce a more consistent layer than continuous rotation.

In one embodiment the present invention provides for a method of depositing a stepped-gradient fuel electrode onto a fuel cell support, that comprises placing a solid oxide fuel cell support that has at least an air electrode layer and an electrolyte layer into a atmospheric plasma spraying chamber and measuring spray parameters of an atmospheric plasma spray to obtain reactive oxides, conductive metal and graphite phases. Then applying the spray parameters onto the solid oxide fuel cell support to produce multiple sub-layers on the solid oxide fuel cell support, and adjusting a hydrogen usage of the atmospheric plasma spray. The adjusting of the hydrogen usage comprises using high hydrogen levels for the initial spraying of the sub-layers producing a first gradient region, and a lower hydrogen level for subsequent spraying of the sub-layers, producing a second gradient region. The first gradient region has a reactive oxides content of 25-50% by weight, and the second gradient region has a reactive oxides content of 10-25% by weight.

In related embodiments, the reactive oxides are YSZ/ScSZ, and the conductive metal is nickel. A gun power of the atmospheric plasma sprayer is 10-20 kWe, with an average of 15 kWe. Varying the gun power will change the ratios of oxide, metal and graphite in the as-sprayed fuel electrode.

In other related embodiments the first gradient region comprises 1-4 sub-layers. The first gradient region has a porosity of not greater than 20 vol %, and the second gradient region has a porosity of at least 30 vol %. In some embodiments the fuel electrode comprises more than two gradient regions, and the spraying is done by indexing the solid oxide fuel cell support.

In another embodiment the present invention provides for a method for spraying a fuel electrode layer onto a solid oxide fuel cell support, that comprises using an atmospheric plasma sprayer to spay multiple sub-layers onto the fuel cell support, the sub-layers comprise a reactive YSZ/ScSZ phase, a nickel conductive metal and graphite for porosity, and the sub-layers form the fuel electrode layer. Then making adjustments to a hydrogen flow to the plasma sprayer during the spraying of the sub-layers. Each adjustment of the hydrogen flow uses a proportionally greater hydrogen amount than each subsequent adjustment of the hydrogen flow, where sub-layers produced with proportionally greater hydrogen flow have proportionally greater reactive oxides content.

In related embodiments the method further comprises indexing the fuel cell support during the method. There are 8-14 sub-layers, 7-11 µm in thickness each. In some embodiments 2-5 multiple adjustments are made, where 2-5 gradient regions are produced.

In another embodiment the present invention for a stepped-gradient fuel electrode deposited on a support tube that comprises multiple sub-layers and multiple gradient regions, each of the gradient regions comprises at least one of the sub-layers. Also the sub-layers comprise a homogenous mixture of reactive oxides and conductive metal, and the sub-layers have a porosity. Initial gradient regions comprise greater reactive oxides concentration than succeeding gradient regions.

In related embodiments the initial gradient regions comprise 25-50% by weight reactive oxides. The succeeding gradient regions comprise 10-25% by weight reactive oxides. In some embodiments the reactive oxides are YSZ/ScSZ, and the conductive metal is nickel. Also, the initial gradient regions comprise a lesser porosity than succeeding regions.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the inventions which, is to be given the full breadth of the claims appended and any and all equivalents thereof.

What is claimed is:

1. A method for depositing a stepped-gradient fuel electrode onto a fuel cell support, comprising:
   placing a solid oxide fuel cell support having an air electrode layer and an electrolyte layer into an atmospheric plasma spraying chamber;
   measuring spray parameters of an atmospheric plasma spray to obtain reactive oxides, conductive metal and graphite phases;
   spraying said spray parameters onto said solid oxide fuel cell support to produce a plurality of sub-layers defining said stepped-gradient fuel electrode on said solid oxide fuel cell support; and
   adjusting a hydrogen gas usage of said atmospheric plasma spray;
   wherein the adjusting of said hydrogen gas usage comprises using a first hydrogen gas level to produce initial sub-layers of said plurality of sub-layers defining a first gradient region and using a second lower hydrogen gas level to produce subsequent sub-layers of said plurality of sub-layers defining a second gradient region;
   wherein said first gradient region has a greater reactive oxides content than said second gradient region;
   wherein said first gradient region has a reactive oxides content of 25-50% by weight; and
   wherein said second gradient region has a reactive oxides content of 10-25% by weight.

2. The method of claim 1, wherein said reactive oxides are YSZ/ScSZ.

3. The method of claim 1, wherein said conductive metal is nickel.

4. The method of claim 1, wherein a gun power of said atmospheric plasma spray is 10-20 kWe.

5. The method of claim 1, wherein said first gradient region comprises 1-4 sub-layers.

6. The method of claim 1, wherein said first gradient region has a porosity of not greater than 20%, and wherein said second gradient region has a porosity of at least 30%.

7. The method of claim 1, wherein said fuel electrode comprises more than two gradient regions.

8. The method of claim 1, wherein said spraying is done by indexing said solid oxide fuel cell support.

9. The method of claim 1, wherein said plurality of sub-layers total 100 µm in thickness.

10. The method of claim 1, wherein said plurality of sub-layers comprise 8-14 sub-layers.

11. The method of claim 1, wherein said adjusting a hydrogen gas usage of said atmospheric plasma spray comprises making a plurality of adjustments of hydrogen flow, wherein each of the plurality of adjustments of hydrogen flow uses a proportionally greater hydrogen amount than a subsequent one of said plurality of adjustments of hydrogen flow, and wherein sub-layers produced with the proportionally greater hydrogen amount have proportionally greater reactive oxides content.

* * * * *